US005163335A

United States Patent [19]

Isom et al.

[11] Patent Number: 5,163,335

[45] Date of Patent: Nov. 17, 1992

[54] UNIVERSAL STARTER MOTOR ASSEMBLY

[75] Inventors: Patrick D. Isom, 19036 Sundown La., Yorba Linda, Calif. 92686; Jack F. Isom; Frank T. Montgomery, both of La Habra, Calif.

[73] Assignee: Patrick D. Isom, Yorba Linda, Calif.

[21] Appl. No.: 729,594

[22] Filed: Jul. 15, 1991

[51] Int. Cl.[5] ........................ F02N 15/02; F16H 57/02

[52] U.S. Cl. ........................................ 74/6; 74/606 R; 123/195 A; 29/401.1; 403/3

[58] Field of Search ................. 74/6, 7 E, 325, 606 R; 29/401.1; 403/3; 123/195 A

[56] References Cited

U.S. PATENT DOCUMENTS

| | | | |
|---|---|---|---|
| 1,155,511 | 10/1915 | Russell | 74/606 X |
| 2,441,990 | 5/1948 | Calhoun | 74/606 |
| 2,475,173 | 7/1949 | Bennett et al. | 74/606 X |
| 4,155,266 | 5/1979 | Bradley | 74/6 |
| 4,362,065 | 12/1982 | Baratti | 74/6 X |

*Primary Examiner*—Allan D. Herrmann
*Assistant Examiner*—Julie Krolikowski
*Attorney, Agent, or Firm*—Edgar W. Averill, Jr.

[57] ABSTRACT

A universal starter motor assembly, which may be affixed to many different makes and models of internal combustion engines. A starter motor and solenoid assembly of the gear reduction type has a face plate which covers the armature gear, supports the idler gear and the outer bearing of the clutch assembly extends through the face plate. Many different styles of mounting adapters can be easily attached to the face plate and are shaped and configured to permit the starter motor assembly to be affixed to a particular style of internal combustion engine. The pinion gear of the starter motor is removable and replaceable from the exterior of the universal starter motor.

10 Claims, 4 Drawing Sheets

UNIVERSAL STARTER MOTOR ASSEMBLY

BACKGROUND OF THE INVENTION

The field of the invention is accessories for internal combustion engines, and the invention relates more particularly to replacement starter motors for the repair and maintenance of internal combustion engines.

Starter motors are made in many different styles and configurations. Many of them are direct-drive starters where the armature of the starter motor has a pinion gear on its shaft which meshes with the flywheel of the engine during starting. Other designs are gear reduction types in which the armature rotates at a higher R.P.M. and operates through an idler gear to drive the pinion gear at the desired R.P.M. Gear reduction starters tend to be smaller in size.

Because of the vast number of models of starter motors, the cost of stocking a reasonable inventory of starter motors is very high and this high cost must, of course, be passed on to the consumer. Some attempts have been made to adapt a starter motor made for one engine to a different engine. One such approach is shown in U.S. Pat. No. 4,155,266 where a high-priced aircraft starter motor was replaced with a less expensive automotive starter motor through the use of a unique starter motor support manufactured for this purpose.

Another use of a substitute starter motor is shown in U.S. Pat. No. 4,362,065. This also utilizes a newly developed endcap assembly and pinion sleeve. A further starter motor conversion is illustrated but not described in Design Patent No. D287,129 which adapts a Hitachi starter motor to a General Motors engine. While such approaches are useful for the particular purposes described therein, they do not provide a universal starter motor which can be used on a wide variety of different engines.

SUMMARY OF THE INVENTION

It is an object of the present invention to provide a starter motor assembly which easily permits the attachment of various adaptors which, in turn, allow the starter motor assembly to be attached to very wide variety of internal combustion engines. By the unique design of adaptor plates, it is believed that the starter motor will be useful for a majority of the internal combustion engines now in use.

The present invention is for universal starter motor assembly including a starter motor with an armature supported by an armature shaft which terminates in an armature gear. The armature gear drives an idler gear which, in turn, drives a clutch assembly drive gear, which is supported by a pinion gear shaft. The pinion gear shaft includes a removable pinion gear and is supported by an inner bearing and an outer bearing. A face plate surrounds the clutch assembly drive gear and covers the armature and idler gears, but the clutch assembly outer bearing extends through the face plate. A plurality of different mounting adapters is provided, each including a pinion gear access opening and a recess for supporting the clutch assembly outer bearing. A plurality of mounting holes permit the attachment of the adaptor to the particular engine for which it is designed and means are provided for affixing the mounting adaptor easily to the face plate.

DESCRIPTION OF THE PREFERRED EMBODIMENTS

Figures 1, 2:
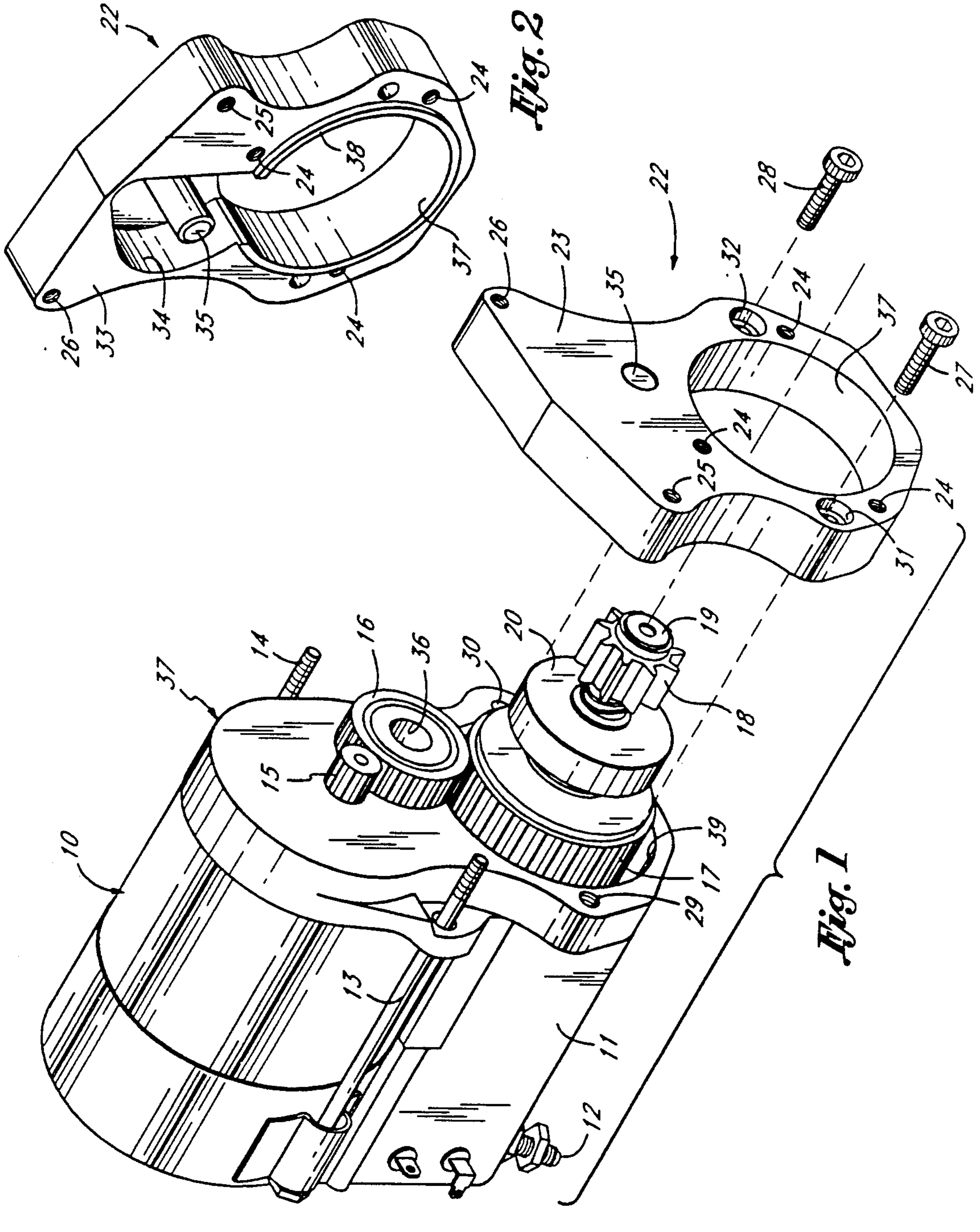
FIG. 1 is an exploded perspective view of the starter motor assembly and face plate of the present invention, excluding the adaptor plate.
FIG. 2 is a perspective view of the inner face of the face plate of FIG. 1.

The universal starter motor of the present invention is shown in perspective view in FIG. 1 without a mounting adaptor. The starter motor is indicated by reference character 10 and the solenoid body, 11, with its terminal, 12, is affixed thereto in a conventional manner. The left-hand portion of FIG. 1 up to the pinion gear is a conventional Nippondenso brand of starter motor with its face plate and mounting assembly removed therefrom. The long threaded bolts, 13 and 14, are used in the original starter motor to hold the front portion of the starter motor not shown to the portion shown in FIG. 1. The armature is contained within starter motor 10 in a conventional manner and the armature gear 15 extends from the armature shaft. Armature gear 15 drives idler gear 16 which, in turn, drives clutch assembly drive gear 17. This is the type of starter motor referred to as a gear reduction starter motor and permits the armature to be turned a much higher R.P.M since gears 16 and 17 reduce the speed at which the pinion gear 18 is rotated to the conventional desired R.P.M. By utilizing a higher armature R.P.M., the size of starter motor 10 may be made much smaller than would be possible for a direct-drive type of starter motor. The small size of the starter motor shown in FIG. 1 is an important factor which permits the starter motor to be used in a wide variety of configurations which are normally designed for a larger starter motor.

Figure 9:
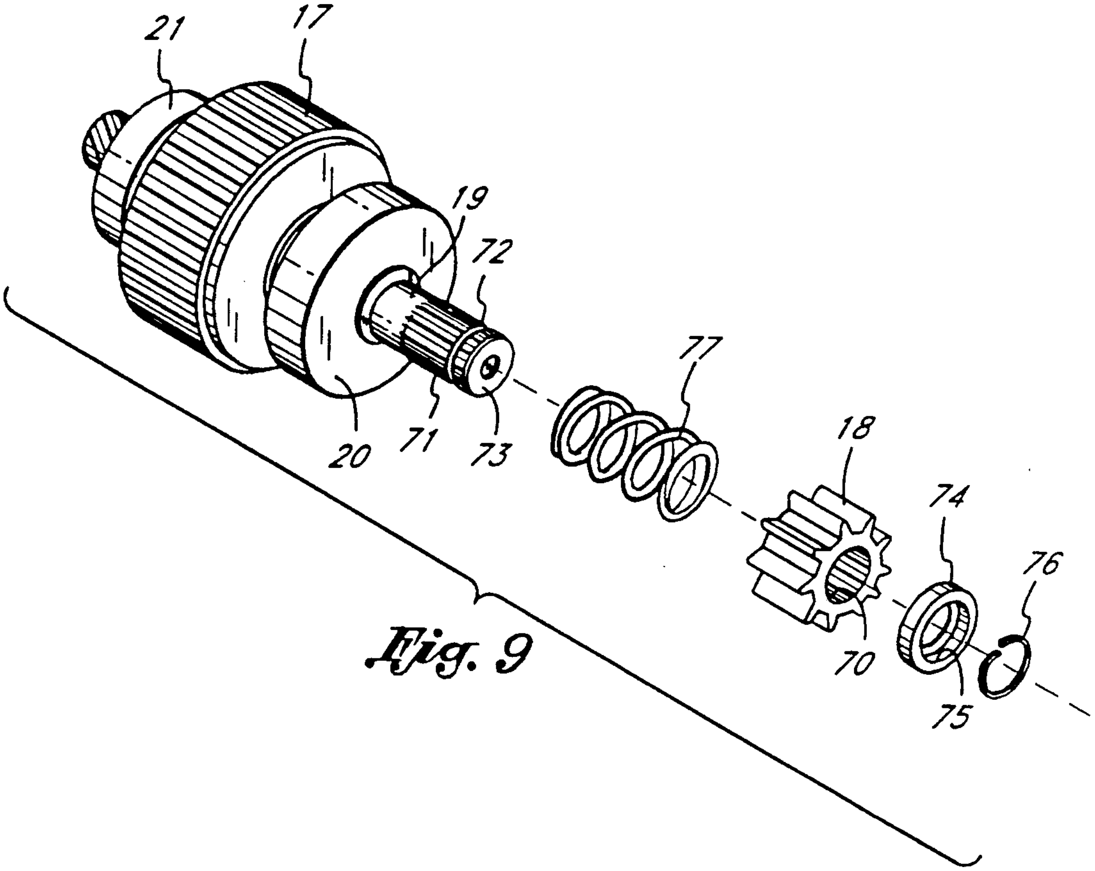
FIG. 9 is an exploded perspective view of the clutch assembly of the universal starter motor of FIG. 1.

The pinion gear shaft 19 holds pinion gear 18 and is supported by a clutch assembly outer bearing 20 and an inner bearing 21 shown in FIG. 9. These two bearings securely support shaft 19 so that no bearing outboard of pinion gear 18 is necessary. This style of starter motor also greatly facilitates the design of a universal starter motor since it eliminates the necessity of attempting to accommodate the bell housing and bearing sleeve which is necessary for most other types of starter motors.

Figures 3, 4:
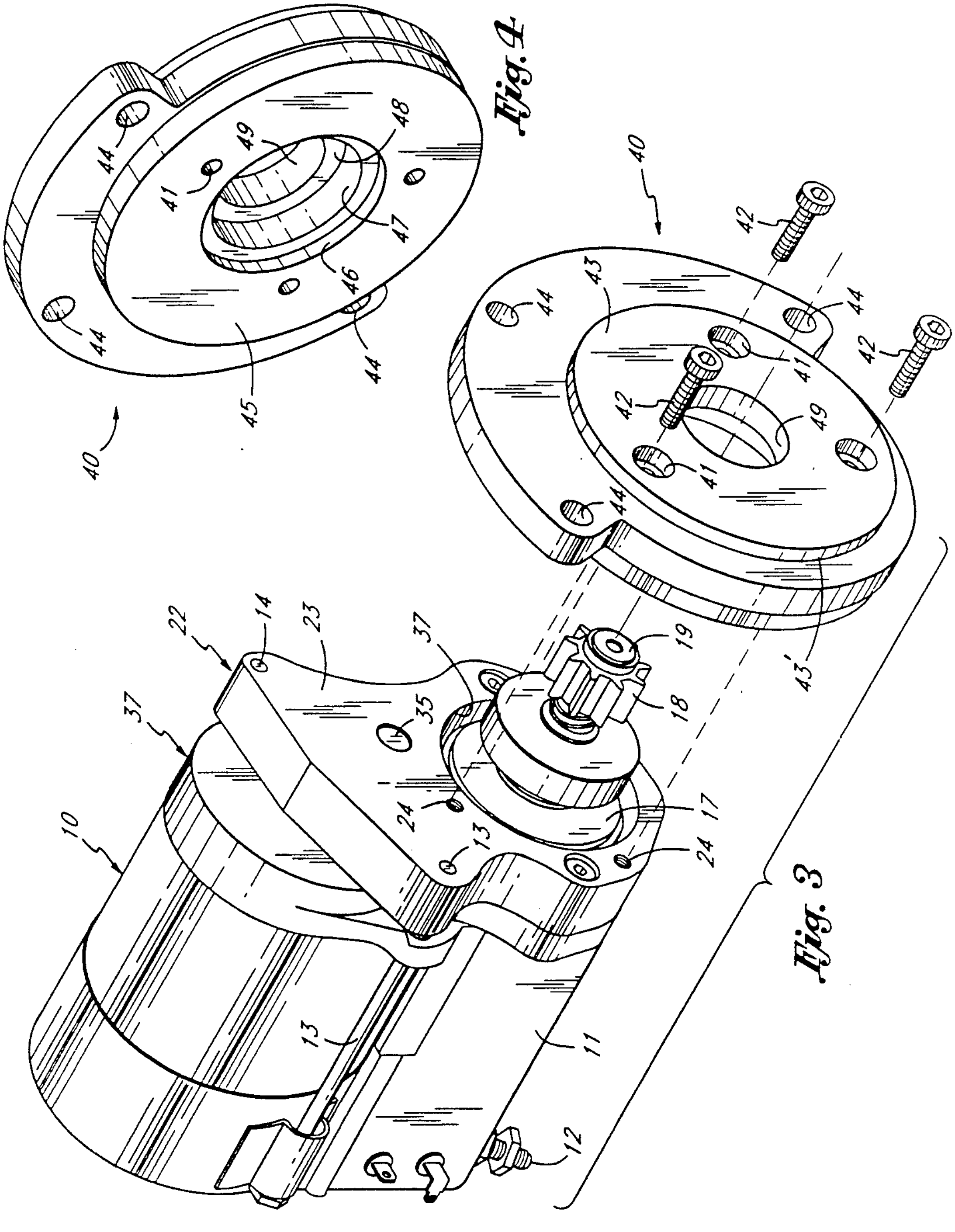
FIG. 3 is an exploded perspective view of the starter motor assembly of FIG. 1 with the face plate affixed and showing the mounting adaptor extended away therefrom.
FIG. 4 is a perspective view of the inner face of the mounting adaptor of FIG. 3.

In order to provide a universal starter motor body, it was necessary to provide a face plate to which numerous adapters could be easily affixed. The face plate 22 has an outer face 23 which is essentially planar except for various recesses. This makes it easy to design mounting adapters since they can be readily held by fasteners which are screwed into the three threaded openings 24 which provide the means for attachment of various adaptor plates. The face plate itself is held to the starter motor by the long bolts 13 and 14 which screw into threaded openings 25 and 26 and by a pair of bolts 27 & 28 which screw into the threaded openings 29 and 30 of the starter motor assembly shown in the left part of FIG. 1. Bolts 27 and 28 are held in recesses 31 and 32 so that the heads of the bolts are below outer face 23 to further facilitate the attachment of various adaptor plates. The inner face 33 of face plate 22 is shown in FIG. 2 where it can be seen that there is a recess 34 which accommodates armature gear 15 and idler gear 16. An idler gear bearing pin 35 supports idler gear 16 and extends past interface 33 into a pin support opening 36 indicated in FIG. 1 and which is formed in plate 37 of starter motor 10. An opening 37 surrounds the clutch assembly drive gear 17 and also permits the pinion gear and clutch assembly outer bearing 20 to extend therethrough. A centering ring 38 is formed over most of the inner edge of opening 37 and fits closely within recess 39 in plate 37. Once the face plate 22 has been secured to the starter motor plate 37, its relatively planar outer face 23 easily permits various mounting adapters to be affixed thereto. The secured face plate 22, as shown in FIG. 3, has its outer face 23 outboard (or farther away from the starter motor) of the clutch assembly drive gear and inboard (or nearer the starter motor) than the clutch assembly outer bearing 20. One particular mounting adaptor is shown in FIG. 3 and FIG. 4 and indicated by reference character 40. Mounting adaptor 40 has three stepped openings 41 which support the heads of Allen bolts 42 which are threaded into threaded openings 24 in face plate 22. The adaptor outer face 43 includes three mounting holes 44 and a circular outwardly stepped ring 43' which is designed to mate with the mounting surface of the engine to which it can be mounted. Since the starter motor 10 is of a very small size compared to most starter motors and further, since there is no significant protrusion beyond pinion gear 18, the starter motor is easily adapted to fit in the space provided for the original starter motor.

The inner face of mounting adaptor 40 is indicated by reference character 45 and includes a first circular recess 46 and a second circular recess 47 which supports the clutch assembly outer bearing. Recess 47 has an inner face 48 which holds the outer bearing 20 in place. A pinion gear access opening 49 provides clearance for the pinion gear which is partially withdrawn into opening 49 when not in use. When the starter motor is energized, the pinion gear 18 moves outwardly through opening 49 in a conventional manner to mesh with the flywheel of the internal combustion engine to which it is affixed.

Figure 6:
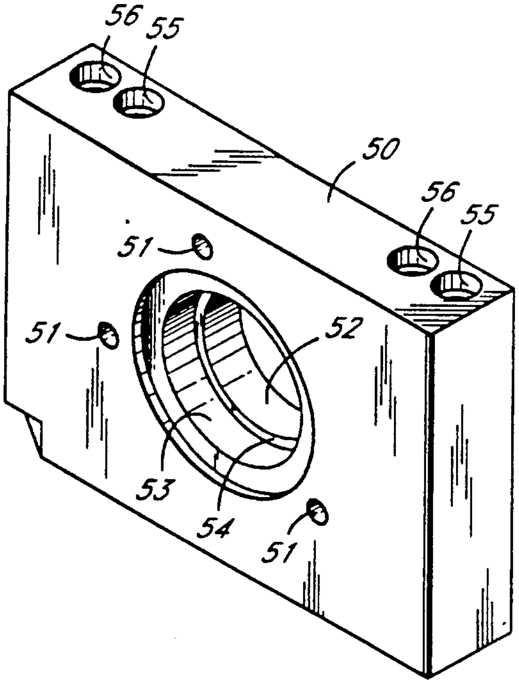
FIG. 6 is a perspective view showing the inner face of the mounting adaptor of FIG. 5.
Figure 5:
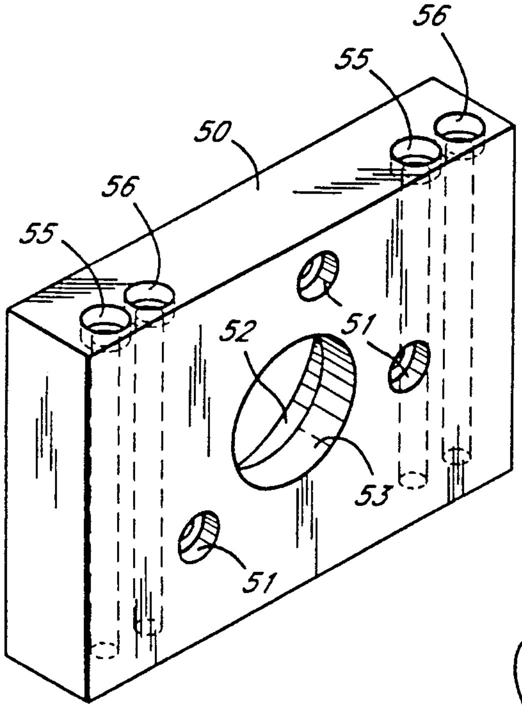
FIG. 5 is a perspective view showing the outer face of an alternate embodiment of a mounting adaptor of the present invention.

Two other styles of adapters are shown in FIGS. 5, 6, 7 and 8. In FIGS. 5 and 6 adaptor plate 50 has three stepped openings 51 which utilize bolts such as those shown in FIG. 3 and identified by reference character 42. The three openings 51 of course match threaded openings 24 so that the bolts that extend therethrough can be tightened into these threaded openings. It should also be noted that openings 51 as well as threaded openings 24 are positioned so that adapters can be mounted in only one position since they are unsymmetrical. Mounting adaptor 50 has a pinion gear access opening 52 which is analogous to opening 49 in mounting adaptor 40. Also, a recess 53 holds outer bearing 20 and has a face 54 which prevents the bearing 20 from any outer movement with respect to adaptor 40. Another feature of the adaptor plate is shown in FIGS. 5 and 6 where two pairs of mounting openings 55 and 56 permit two different mountings of the completed starter motor assembly. With one set of mountings the pinion gear can be used with a smaller flywheel of a particular Chevrolet engine and, with the other pair of mounting openings, a larger flywheel, which is used in a modified Chevrolet engine, can be accommodated.

It should be noted that mounting holes 55 and 56 are parallel to the face 23 of faceplate 22 whereas openings 44 in mounting adaptor 40 are normal to face 23. The particular orientation and style of mounting openings is, of course, dictated by the particular engine to which the universal starter motor will be affixed.

Figure 8:
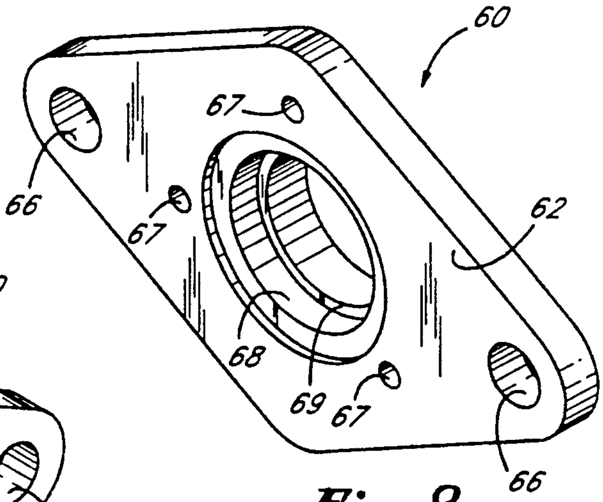
FIG. 8 is a perspective view of the inner face of the mounting adaptor of FIG. 7.
Figure 7:
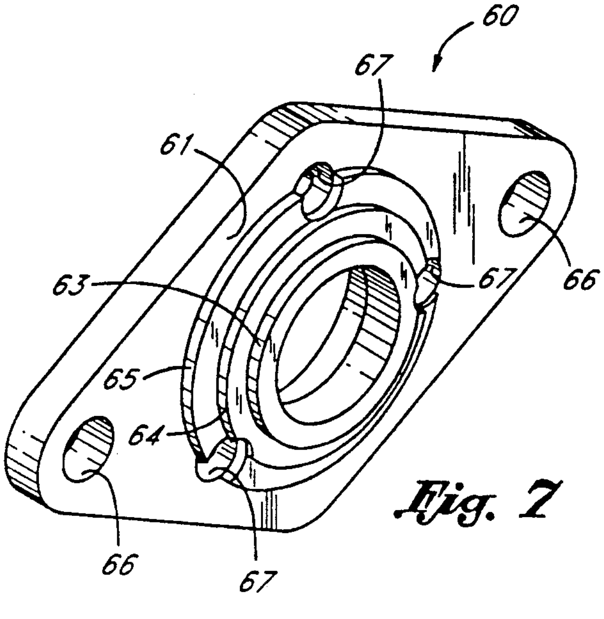
FIG. 7 is a perspective view of the outer face of an alternate embodiment of the mounting adaptor of the present invention.

A different style of mounting adaptor is shown in FIGS. 7 and 8 and indicated by reference character 60. Mounting plate 60 has an outer face 61 and an inner face 62. A series of mounting rings 63, 64 and 65 extend from the outer face and the mounting holes 66, like those in mounting adaptor 40, are normal to the inner face 23. Stepped openings 67 permit bolts 42 to be held therein and threaded into threaded openings 24. A bearing recess 68 has a face 69 analogous to face 54. Adaptor plate 60 is designed for attachment to a Volkswagen engine. In this regard it should be noted that the starter motor can be made to rotate in either direction and, for some engines such as the Volkswagen, a reverse rotation is required.

Figure 10:
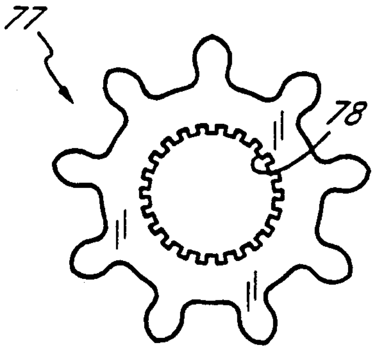
FIG. 10 is an end view of an alternate configuration of pinion gear, useful for attachment to the starter motor of FIG. 1.

Turning now to FIG. 10, the means for affixing various pinion gears is shown. Pinion gear 18 has a splined opening 70 which mates with splined portion 71 of pinion gear shaft 19. A recessed ring 72 is formed near the outer end 73 of shaft 19. A retaining ring cup 74 has a center recess 75 which surrounds retaining ring 76 when the elements of FIG. 9 are assembled. To assemble the elements, spring 77 is placed over pinion gear shaft 19 followed by pinion gear 18. Next the retaining ring cup is placed over the outer end 73 and spring 77 is compressed to expose recessed ring 72. Retaining ring 76 is then snapped over the outer end 73 of shaft 19 and into recessed ring 72. The retaining ring cup 74 and the pinion gear 18 are then released and move recess 75 of retaining ring cup over retaining ring 76 to hold it securely in place.

A pinion gear 77 having a different gear configuration than pinion gear 18 is shown in FIG. 10. The splined opening 78 is identical to splined opening 70 so that gear 77 may be placed over the splined portion 71 of pinion gear shaft 19. It will be readily understood that pinion gears having different outside diameters, number of gear teeth and gear teeth configurations can be place on pinion gear shaft 19.

It would thus be possible for a parts supplier to stock a standard universal starter motor of the type shown in the left-hand portion of FIG. 3 with various adaptor plates. It is anticipated that the pinion gears will be assembled before the starter motor is sent to the parts retail supplier. Thus, the retail supplier would merely look in an instruction manual and be advised of which starter motor and which adaptor plate is necessary any particular style of engine. The adaptor plate can readily be installed by the purchaser and the parts supplier can substantially reduce his inventory. It would also be practical to prepare an adaptor plate for a relatively rare engine for which the starter motor is no longer available. This would permit a repair to be made that would otherwise be impractical. Furthermore, the gear reduction type of starter motor shown in the drawings is of a higher quality than many original equipment starter motors and thus is capable of being substituted for such original equipment starter motors without problem.

While three different styles of mounting adapters are shown, it should be understood that the adapters are dictated by the mounting configuration of the engine to which they are affixed. All adaptor plates have in common, however, the bearing recess and inner face as well as the openings which match the openings in the face plate 22.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A universal starter motor assembly including:
- a starter motor with an armature supported by an armature shaft having an external end;
- an armature gear held to the external end of the armature shaft;
- an idler gear driven by said armature gear and supported on an idler gear bearing pin;
- a clutch assembly including a clutch assembly drive gear which is turned by said idler gear, said clutch assembly including an clutch assembly outer bearing;
- a pinion gear shaft, having an end, passing in an axial manner through said clutch assembly drive gear and being supported by said clutch assembly outer bearing and by an inner bearing wherein said starter motor may be affixed to many different types of engines by an adapter assembly comprising:
- a face plate having:
- an opening which surrounds the clutch assembly drive gear;
- an outer face which is inboard of the clutch assembly outer bearing; and
- means for the attachment of a mounting adapter to said face plate;
- a plurality of different mounting adapters, each mounting adapter including:
- an adapter inner face configured to mate with the outer face of said face plate;
- an adapter outer face;
- a pinion gear access opening;
- a clutch assembly outer bearing support recess accessible from said inner face;
- means for attachment of the assembly to an engine, the configuration of said means for attachment of the assembly being dictated by the configuration of the engine to which it will be attached; and
- means for affixing the mounting adapter to said face plate, said means for affixing the mounting adapter to said face plate being accessible from the exterior of the starter motor assembly.

2. The universal starter motor assembly of claim 1 wherein said means for the attachment of a mounting adapter to said face plate and said means for affixing the mounting adapter to the face plate comprise threaded openings which extend inwardly from said outer face of said face plate and a plurality of bolts extending through bolt holes in the mounting adapter.

3. The universal starter motor assembly of claim 2 wherein there are three threaded openings.

4. The universal starter motor assembly of claim 1 wherein the outer face of said face plate is generally planar.

5. The universal starter motor assembly of claim 2 wherein said bolt holes in said mounting adapter comprise stepped openings accessible from the adapter outer face.

6. The universal starter motor assembly of claim 1 further including means for removing and replacing the pinion gear from the pinion gear shaft without having to remove the pinion gear shaft from the starter motor, said means comprising a splined portion on said pinion gear shaft near the end thereof, a mating splined opening on said pinion gear, a recessed ring in the pinion gear shaft near the end thereof, a retaining ring cup surrounding said pinion gear shaft, said retaining ring cup including a recess and a retaining ring removably held in said recessed ring and held therein by said recess of said retaining ring cup.

7. The universal starter motor assembly of claim 1 wherein said means for attachment of the assembly to an engine are mounting holes which are normal to the adapter inner face.

8. The universal starter motor assembly of claim 1 wherein said means for attachment of the assembly to an engine are mounting holes which are parallel to the adapter inner face.

9. A universal starter motor assembly including:
- a starter motor with an armature supported by an armature shaft having an external end;
- an armature gear held to the external end of the armature shaft;
- an idler gear driven by said armature gear and supported on an idler gear bearing pin;
- a clutch assembly including a clutch assembly drive gear which is turned by said idler gear, said clutch assembly including an clutch assembly outer bearing;
- a pinion gear shaft passing in an axial manner through said clutch assembly drive gear and being supported in part by said clutch assembly outer bearing and in part by an inner bearing wherein said starter motor may be affixed to many different types of engines by an adapter assembly comprising:
- a removable face plate having:
- an opening which surrounds the clutch assembly drive gear;
- an outer face which is outboard of the idler gear and the armature gear and inboard of the clutch assembly outer bearing;
- an inner face including a recess for surrounding said armature gear and said idler gear, said recess having an inner face which supports said idler gear bearing pin; and
- means for attachment of an adapter plate thereto;
- a plurality of different mounting adapters, each mounting adapter including:

an adapter inner face configured to mate with the outer face of said face plate;

an adapter outer face;

a pinion gear access opening;

a clutch assembly outer bearing support recess accessible from said inner face;

a plurality of mounting holes for attachment of the assembly to an engine, the configuration of said mounting holes being dictated by the configuration of the engine to which it will be attached;

means for affixing the mounting adapter to said means for attachment of an adapter plate thereto of said face plate, said means for affixing the mounting adapter being accessible from the exterior of the starter motor assembly; and means for removing and replacing the pinion gear from the pinion gear shaft without having to remove the pinion gear shaft from the starter motor.

10. The universal starter motor assembly of claim 9 wherein said removable face plate has a centering ring extending inboard from said inner face surrounding more than half way around said opening which surrounds the clutch assembly drive gear.

* * * * *